(12) United States Patent
Rottner et al.

(10) Patent No.: US 12,154,716 B2
(45) Date of Patent: Nov. 26, 2024

(54) METHOD FOR PRODUCING AN INDUCTIVE COMPONENT

(71) Applicant: TDK Electronics AG, Munich (DE)

(72) Inventors: Michael Rottner, Unterhaching (DE); Stefan Weber, Munich (DE)

(73) Assignee: TDK Electronics AG, Munich (DE)

( * ) Notice: Subject to any disclaimer, the term of this patent is extended or adjusted under 35 U.S.C. 154(b) by 659 days.

(21) Appl. No.: 17/257,821

(22) PCT Filed: Jul. 26, 2019

(86) PCT No.: PCT/EP2019/070252
§ 371 (c)(1),
(2) Date: Jan. 4, 2021

(87) PCT Pub. No.: WO2020/025500
PCT Pub. Date: Feb. 6, 2020

(65) Prior Publication Data
US 2021/0272741 A1    Sep. 2, 2021

(30) Foreign Application Priority Data
Jul. 31, 2018   (DE) .................. 102018118551.0

(51) Int. Cl.
| H01F 7/06 | (2006.01) |
| H01F 27/06 | (2006.01) |
| H01F 27/29 | (2006.01) |
| H01F 41/02 | (2006.01) |
| H01F 41/06 | (2016.01) |

(52) U.S. Cl.
CPC ............. *H01F 27/29* (2013.01); *H01F 27/06* (2013.01); *H01F 41/0206* (2013.01); *H01F 41/06* (2013.01)

(58) Field of Classification Search
CPC ....... B28B 1/001; H01F 27/06; H01F 27/263; H01F 27/2804; H01F 27/29; H01F 27/292; H01F 5/00; H01F 5/106; H01F 41/0206; H01F 41/04; H01F 41/06; H01F 2027/2819; B33Y 10/00; B33Y 80/00; B22F 5/106
See application file for complete search history.

(56) References Cited

U.S. PATENT DOCUMENTS

| 3,602,745 A * | 8/1971 | Davis ................... H02K 41/025 310/13 |
| 5,000,988 A * | 3/1991 | Inoue .................... B05C 5/0216 427/427.3 |
| 6,144,276 A * | 11/2000 | Booth ................. H01F 27/2876 336/200 |

(Continued)

FOREIGN PATENT DOCUMENTS

| CN | 105632893 A | 6/2016 |
| CN | 108010711 A | 5/2018 |

(Continued)

*Primary Examiner* — Paul D Kim
(74) *Attorney, Agent, or Firm* — Slater Matsil, LLP

(57) ABSTRACT

In an embodiment a method for producing an inductive component includes applying a conductive material and an insulating material in an additive manufacturing process. The conductive material forms at least one winding having a plurality of superimposed turns and the insulating material forms a carrier for the at least one winding. The turns are connected to form a spiral-shaped winding.

5 Claims, 2 Drawing Sheets

(56) References Cited

U.S. PATENT DOCUMENTS

| | | | | |
|---|---|---|---|---|
| 7,142,084 | B2* | 11/2006 | Cheng | H01F 41/0246 |
| | | | | 336/200 |
| 11,488,768 | B2 | 11/2022 | Lee et al. | |
| 2008/0007378 | A1* | 1/2008 | Hanser | H01F 41/09 |
| | | | | 29/605 |
| 2014/0176290 | A1 | 6/2014 | Jang et al. | |
| 2016/0249490 | A1 | 8/2016 | Shepard et al. | |
| 2016/0375606 | A1 | 12/2016 | Reeves | |

FOREIGN PATENT DOCUMENTS

| | | |
|---|---|---|
| DE | 202007003747 U1 | 6/2007 |
| DE | 102013010228 A1 | 3/2014 |
| DE | 102013013335 A1 | 2/2015 |
| DE | 102017210856 A1 | 1/2019 |
| EP | 1085535 B1 | 9/2009 |
| JP | 2001155932 A | 6/2001 |
| JP | 2014175531 A | 9/2014 |
| JP | 2017098544 A | 6/2017 |
| WO | 2012040563 A2 | 3/2012 |
| WO | 2017070832 A1 | 5/2017 |

\* cited by examiner

METHOD FOR PRODUCING AN INDUCTIVE COMPONENT

This patent application is a national phase filing under section 371 of PCT/EP2019/070252, filed Jul. 26, 2019, which claims the priority of German patent application 102018118551.0, filed Jul. 31, 2018, each of which is incorporated herein by reference in its entirety.

TECHNICAL FIELD

The present invention relates to a method for producing an inductive component and to an inductive component.

BACKGROUND

A planar transformer in which thin printed circuit boards are stacked one on top of each other is known from European Patent No. 1085535 B1, wherein turns are formed on the printed circuit boards and the turns are connected to form a winding via through connections. In this case, the printed circuit boards guarantee the required insulation between the turns.

In order to produce the planar transformer, recesses for the magnetic material are stamped out or milled, wherein the cut-out material cannot be reused. Moreover, the through connections form points of constriction which limit the power compatibility of the component. Furthermore, available space in the winding space cannot be used in an optimal manner by the planar transformer.

SUMMARY

Embodiments provide an improved inductive component and a method for producing said component.

A method for producing an inductive component is proposed in which a conductive material, which forms at least one winding, and an insulating material, which forms a carrier for the at least one winding, are applied in an additive manufacturing method.

In this case, the insulating material can be arranged between the individual turns of the winding. Consequently, the insulating material can insulate the individual turns against one another and form a carrier which stabilizes the winding in a mechanical manner.

Additive manufacturing methods are also described as generative manufacturing methods. An additive manufacturing method can be a method in which manufacturing takes place by means of chemical and/or physical processes based on a data model of a shapeless or shape-neutral material. The shapeless material can be a gel, a paste or a powder, for example. The shape-neutral material can be band-shaped, wire-shaped or leaf-shaped, for example.

The additive manufacturing method can be 3D printing, for example. 3D printing is a method in which a material is applied layer by layer and three-dimensional objects are thus created. In this case, a layered construction of one or a plurality of liquid or solid substances according to predetermined dimensions and shapes takes place in a computer-controlled manner. Physical and/or chemical curing processes and/or melting processes occur during construction.

Alternatively, the additive manufacturing method can also be a dispenser printing method. In this case, a paste-like or gel-like material is applied in layers by means of a nozzle or a syringe and, layer by layer, is assembled to form a three-dimensional object.

The additive manufacturing method offers a number of advantages when manufacturing the inductive component. The additive manufacturing method makes it possible to manufacture the component with a high degree of precision. Manufacturing the winding in a manner in which no through connection for connecting the individual turns of the winding are required can be made possible by using the additive manufacturing method. The disadvantages of the planar transformer from European Patent No. 1085535 B1 can therefore be overcome. Since the winding can be free from through connections, the power compatibility of the inductive component is not limited by through connections. No material is wasted in the additive manufacturing method, since recesses do not have to be stamped out or milled in the winding. Moreover, the additive manufacturing method makes it possible to construct the component in such a way that an available space can be used in an optimal manner.

The winding which is manufactured in the additive manufacturing method can be free from compressions or elongations. Consequently, the winding has no weak points in the material. As a result, the lifespan and the power compatibility of the additive component can be improved.

The additive manufacturing method makes it possible for the turns of the at least one winding to be formed very flat. As a result, a structure can be established which is designed to be optimal for use in high-frequency applications.

The conductive material and the insulating material can be applied in the same process step. Consequently, the two materials can be applied simultaneously. For example, the two materials can be applied simultaneously by different nozzles of a 3D printer. By applying the insulating material and the conductive material in the same process step, a method can be provided which can be carried out quickly. As a result, the component can be manufactured within a short period of time.

The at least one winding can be spiral-shaped. The at least one winding can be produced in the shape of a spiral with different diameters, cross sections and helix angles in the additive manufacturing method. Consequently, the additive manufacturing method makes it possible to always adapt the at least one winding to the desired intended use in an optimal manner.

The conductive material can comprise copper. Alternatively, the conductive material can be copper. Copper is well suited as a conductive material for the at least one winding, since copper has high conductivity and is cost effective.

The insulating material can comprise a ceramic material or can consist of a ceramic material. If the conductive material is a material which comprises copper, sintering the inductive component may be required since copper only displays the desired conductivity after the sintering process. Consequently, when selecting the insulating material, a material should be selected which can be sintered. It is for this reason that a ceramic material is suitable for use as an insulating material, since the ceramic material can be sintered. Alternatively, a plastics material could be used as an insulating material.

The inductive component can be free from through connections. Through connections would limit the performance of the component. The additive manufacturing method makes it possible to manufacture the carrier and the at least one winding in the desired three-dimensional shape, so that through connections can be dispensed with.

The inductive component can be a planar transformer or a planar coil, for example. The planar coil can be a storage choke, for example. Planar transformers are primarily employed in power electronics at high transmission powers.

After additive manufacture of the at least one winding and the carrier, a magnetic core can be arranged in such a way that the core is encompassed by the at least one winding. The core may include a ferrite material.

Further embodiments provide to an inductive component. In this case, this can be a component which has been manufactured according to method described above. Consequently, all structural and functional features which have been disclosed in relation to the method may also be applied to the component.

A component is proposed which has at least one spiral-shaped winding made of a conductive material and a carrier made of an insulating material, into which the spiral-shaped winding is incorporated. In this case, the winding is described as being incorporated into the carrier if the insulating material of the carrier is arranged between the individual turns of the winding and the turns are thus insulated against one another.

Using the additive manufacturing method makes it possible to form the winding in a spiral shape. The spiral shape offers the advantage of being able to dispense with through connections, so that power compatibility of the component is not limited. The additive manufacturing method makes it possible to manufacture the at least one winding with virtually any cross sections, diameters and helix angles.

The at least one spiral-shaped winding can be free from elongations and compressions. Elongations and compressions would represent weaknesses in the material which could limit the power compatibility of the inductive component and could lead to damage to the component over its lifespan. It is possible to manufacture the spiral-shaped winding without elongations and compressions by using an additive manufacturing method.

The at least one spiral-shaped winding can be free from through connections. Through connections which would otherwise limit the power compatibility of the component can be dispensed with by using the additive manufacturing method.

The inductive component can be a planar transformer or a planar coil.

The conductive material can be copper or a material which comprises copper. The insulating material can include a ceramic material or can be a ceramic material.

The conductive material and the insulation material may have been applied in an additive manufacturing method.

BRIEF DESCRIPTION OF THE DRAWINGS

Preferred exemplary embodiments of the invention are described in greater detail hereinafter using the figures.

DETAILED DESCRIPTION OF ILLUSTRATIVE EMBODIMENTS

Figure 1:
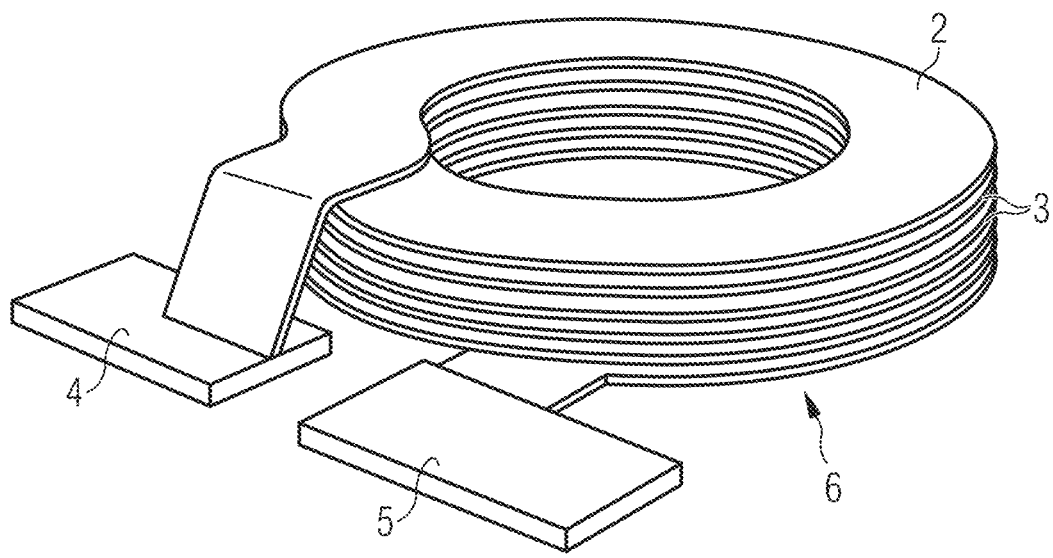
FIG. 1 shows a perspective view of a winding of an inductive component.

FIG. 1 shows a perspective view of a winding 2 of an inductive component 1. Here, the inductive component 1 is a planar coil. The winding 2 has a plurality of superimposed turns 3. The turns 3 are connected to form a spiral-shaped winding 2.

The inductive component 1 has a first connection face 4 and a second connection face 5. A first end of the spiral-shaped winding 2 connected to the first connection face 4. A second end of the spiral-shaped winding 2 connected to the second connection face 5. The two connection faces 4, 5 are arranged at an underside 6 of the component 1 and make surface mounting of the component 1 possible. The component 1 is thus a surface mounted component (Surface Mounted Device=SMD).

The winding 2 shown in FIG. 1 and the connection faces 4, 5 are produced by an additive manufacturing method. The additive manufacturing method can be 3D printing, for example. In the additive manufacturing method, a conductive material, for example copper, is applied, and the winding 2 and the connection faces 4, 5, which each consist of the conductive material, are thus created. In this case, as is explained hereinafter, the winding 2 and the connection faces 4, 5 are manufactured at the same time as an insulating carrier 7.

Figure 2:
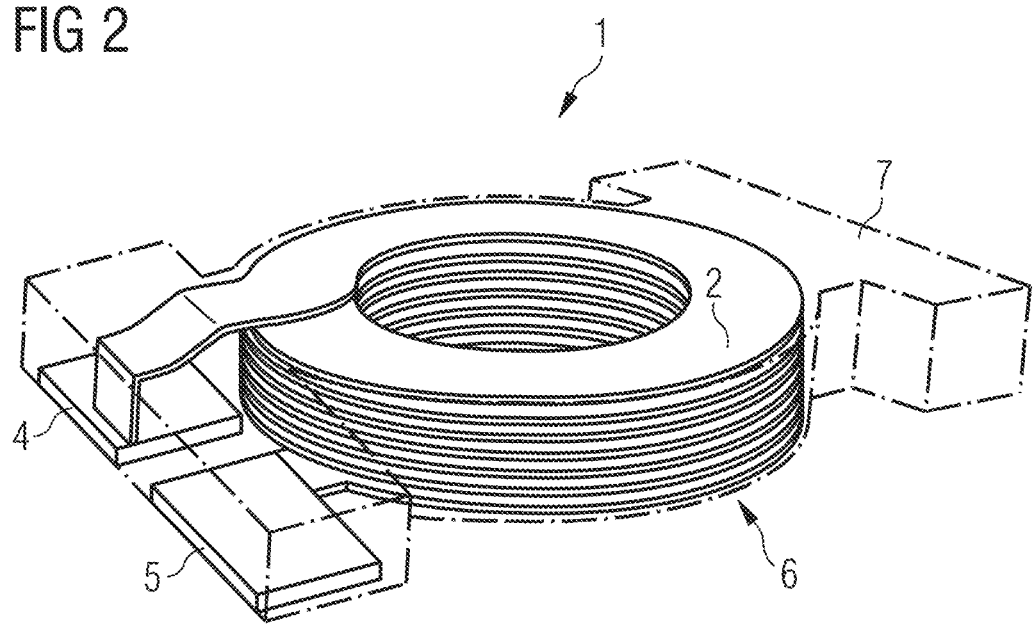
FIG. 2 shows a perspective view of the inductive component.

FIG. 2 shows a perspective view of the inductive component 1. In addition to the winding 2, the inductive component 1 has the insulating carrier 7.

The winding 2 is incorporated into the insulating carrier 7. In this case, a material of the carrier 7 is arranged between the turns 3 of the spiral-shaped winding 2. The insulating carrier 7 therefore forms a mechanical support for the winding 2. The carrier 7 further forms an insulator which prevents a short circuit between the turns 3 of the winding 2. The connection faces 4, 5 are not covered by the insulating carrier 7 on the underside 6 of the component 1.

In the additive manufacturing method, the insulating carrier 7 is produced from an insulating material. The carrier and the turn can be produced in the same process step of the additive manufacturing method. In this case, the insulating material, which forms the carrier, and a conductive material, which forms the winding, are applied simultaneously in layers.

Figure 3:
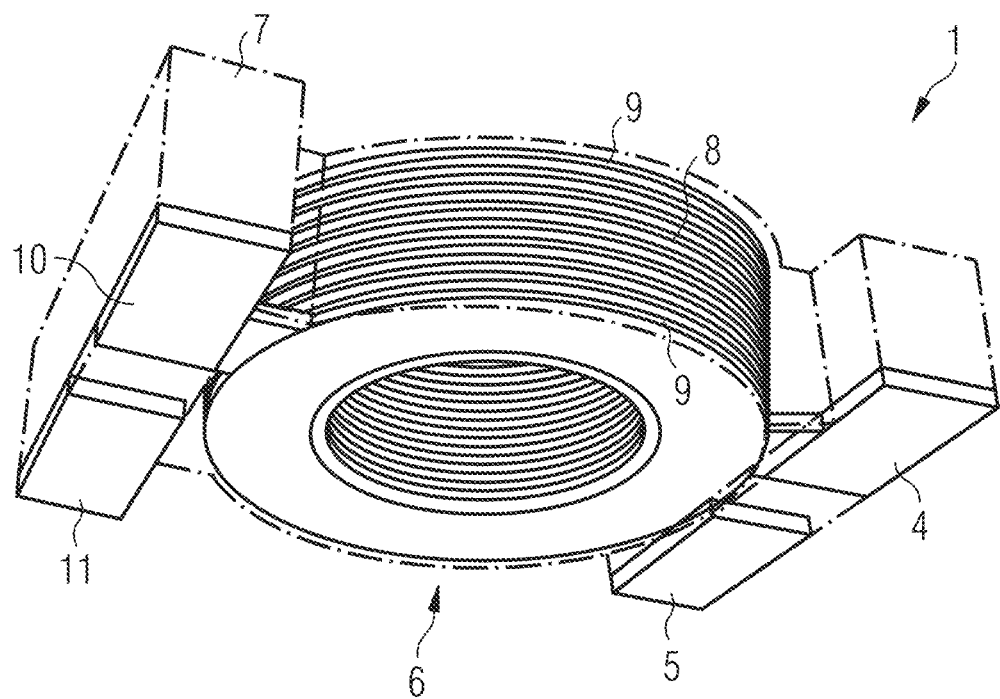
FIG. 3 shows a perspective view of a further inductive component.

FIG. 3 shows a perspective view of a further inductive component 1 which has been produced by means of the additive manufacturing method. The component 1 is a planar transformer. The component 1 has two windings and one carrier 7. In particular, the component has a primary winding 8 and a secondary winding 9. The primary winding 8 has turns which form a spiral-shaped winding. The secondary winding 9 also has turns which form a spiral-shaped winding.

The inductive component 1 further has four connection faces 4, 5, 10, 11. The first and the second connection face 4, 5 are connected to the primary winding 8. The third and the fourth connection face 10, 11 are connected to the secondary winding 9. The four connection faces 4, 5, 10, 11 are arranged at the underside 6 of the component 1 and are free from the carrier 7 at the underside 6 of the component 1. The connection faces 4, 5, 10, 11 make surface mounting of the component 1 possible as a result.

The component 1 further has the insulating carrier 7, into which the primary winding 8 and the secondary winding 9 are incorporated. The insulating carrier 7, the primary winding 8 and the secondary winding 9 are produced in the additive manufacturing method. In this case, the carrier 7 and the windings 8, 9 are produced in one single process step in which both the insulating material, which forms the carrier 7 for the windings 8, 9, and also the conductive material, which forms the two windings 8, 9, are applied in an additive manner.

The planar transformer is different from the coil shown in FIGS. 1 and 2 insofar as two windings 8, 9 are formed to be galvanically separated from one another in the component 1 in the case of the transformer. The carrier 7, which is formed from the insulating material, ensures both insulation between the primary winding 8 and the secondary winding 9 and also insulation between the individual turns of the respective windings 8, 9. As a result, requirements can be strictly met concerning insulation distances within the component 1. The available space in the winding space can be utilized in an optimal manner.

Figure 4:
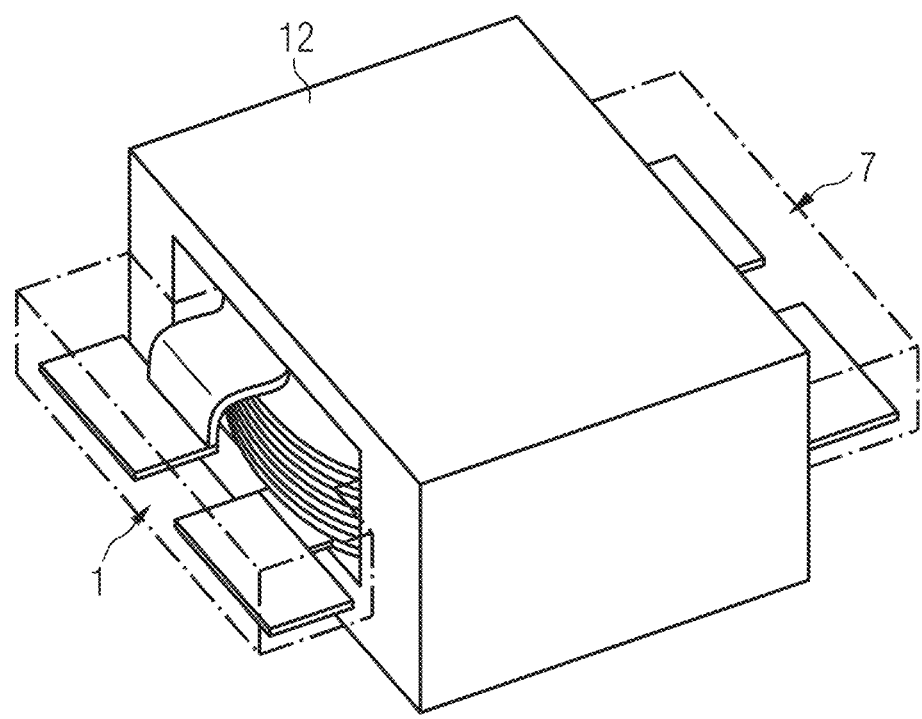
FIG. 4 shows a planar transformer.

FIG. 4 shows a perspective view of the planar transformer, wherein a magnetic core 12 has been attached to the planar transformer. The magnetic core 12 can consist of a ferrite material, for example. The magnetic core 12 is arranged in such a way that it is encompassed by the primary winding 8 and the secondary winding 9. The magnetic core 12 consists of two pails which are firmly connected to one another, for example by way of adhesive bonding.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A method for producing an inductive component, the method comprising:

applying a conductive material and an insulating material in an additive manufacturing process, wherein the conductive material forms at least one spiral-shaped winding having a plurality of superimposed turns and two connection faces, wherein the insulating material forms a carrier for the at least one spiral-shaped winding, and wherein the at least one spiral-shaped winding, the two connection faces and the carrier are formed at the same time by the additive manufacturing process; and after applying the at least one winding, arranging a magnetic core such that the magnetic core is encompassed by the at least one winding, wherein the two connection faces are arranged at an underside of the inductive component, and wherein the inductive component is a surface mounted component.

2. The method according to claim 1, wherein the conductive material comprises copper.

3. The method according to claim 1, wherein the insulating material comprises a ceramic material.

4. The method according to claim 1, wherein the inductive component is free from through connections.

5. The method according to claim 1, wherein the inductive component is a planar transformer or a planar coil.

* * * * *